Patented Jan. 11, 1927.

1,613,674

UNITED STATES PATENT OFFICE.

IWAN OSTROMISLENSKY, OF NEW YORK, N. Y., ASSIGNOR TO THE NAUGATUCK CHEMICAL COMPANY, OF NAUGATUCK, CONNECTICUT, A CORPORATION OF CONNECTICUT.

METHOD OF OBTAINING COLORED POLYMERIZED STYROL AND ITS HOMOLOGUES AND PRODUCTS OBTAINED THEREBY.

No Drawing.    Application filed February 3, 1925. Serial No. 6,553.

This invention relates to processes for coloring styrol and its homologues. It also includes a process for making what is hereafter termed styrol amber.

The present invention is a continuation in part of application Serial No. 5457, filed January 29, 1925, in which is described a method for coloring vitreous polymerized styrols by dissolving coloring materials in unpolymerized styrols and polymerizing the solution thus obtained.

There are many imitations of the natural amber such as phenol-aldehyde condensation products and other resins prepared in somewhat similar manner. Glass has been colored to imitate the natural amber coloring. This glass imitation possesses the disadvantage of a higher specific gravity compared to that of amber. The condensation products require considerable care in their manufacture for the reason that certain of the materials used therein have somewhat poisonous properties or are disagreeable to work with. The polymerized styrols have a gravity approximately the same as that of genuine amber and can otherwise be made practically identical with amber in color and lustre.

With a preferred embodiment in mind but without intention to limit the invention beyond what is required by the prior art, the invention broadly stated consists in dissolving an azo dye in unpolymerized styrol and subjecting the solution to complete polymerization, pulverizing the polymer obtained and dissolving a portion thereof in raw styrol and polymerizing the solution of the coloring material into a vitreous product. The invention also consists in preparing coloring materials adapted to give tints similar to those found in natural amber.

*Example 1.*—From 0.5–1.0 grams of an azo dye such as para amino phenyl azobenzol are dissolved in 100 grams of styrol of fairly high purity. The solution is then polymerized completely at the temperatures usually required, say from 140° C.–180° C. During this polymerization the azo dye which is used will be decomposed to what appears to be a new brownish dyestuff. The resultant polymerized solution has a dark brown or almost black color and may be regarded as a coloring material. The dark colored glass is then pulverized and a small portion thereof is dissolved in unpolymerized styrol. The exact shade desired in the final product will be the same as that obtained in the styrol solution of the dark powder. The styrol solution of this powder is then polymerized under conditions to form the vitreous polymerized styrol. The final product is a transparent low-gravity vitreous mass which has the same color as amber and of the amber imitations.

Instead of the particular azo dye mentioned in the above example, other azo dyes of the benzol series or of the pyridine series can be used. It is necessary of course that, as pointed out in my copending application Serial No. 5457 filed January 29, 1925, the dyestuff employed must be capable of withstanding the polymerization temperatures without substantial change of color intensity.

In preparing the coloring material, namely the dark colored polymerized styrol containing the azo dye in question, it is frequently desirable to form the beta or brittle modification in order to facilitate reducing the polymer to a powder. A powdered styrol containing the azo dye in question can be made according to the method outlined in my copending application Serial No. 711,586, filed May 7, 1924.

The herein described process can be applied to the homologues of styrol, and the claims are to be so interpreted. The expression "styrol amber" used in the claims refers to the product of this invention, namely amber colored vitreous polymerized styrol.

As many apparently widely different embodiments of this invention may be made without departing from the spirit thereof, it will be understood that I do not intend to limit myself to the specific embodiments herein set forth except as indicated in the appended claims.

Having thus described my invention, what I claim and desire to protect by Letters Patent is:

1. A method of making colored polymerized styrols which comprises incorporating with an unpolymerized styrol the decomposition product of an azo dye in polymerized styrol, and polymerizing the mixture to a colored vitreous polymerized styrol.

2. A method of making colored polymerized styrols which comprises dissolving an azo dye in styrol, polymerizing the solution, pulverizing the polymer, dissolving said powder in unpolymerized styrol, and polymerizing the solution to a colored vitreous polymerized styrol.

3. A method of making colored polymerized styrols which comprises dissolving a substantial azobenzol in styrol, completely polymerizing the solution, pulverizing the polymer, dissolving it in styrol, and polymerizing to a colored vitreous polymerized styrol.

4. A method for producing an amber-colored vitreous polymerized styrol which comprises dissolving para amino phenyl azobenzol in styrol, completely polymerizing the solution, pulverizing the polymer, dissolving it in styrol, and polymerizing to a colored vitreous polymerized styrol.

5. In a process for producing colored vitreous polymerized styrols, the steps of forming a coloring material, which comprise dissolving an azo dye in styrol, completely polymerizing the solution, and reducing the polymer to a powder.

6. As a new product amber-colored polymerized styrol combined with a substituted azo benzol.

7. As a new product styrol amber, a transparent vitreous product comprising polymerized styrol combined with a phenyl azo benzol.

8. As a new product styrol amber, a transparent vitreous product consisting of polymerized styrol combined with para amino phenyl azo benzol.

Signed at Cromwell, county of Middlesex, State of Connecticut, this 28th day of January, 1925.

IWAN OSTROMISLENSKY.

azo dye in styrol, polymerizing the solution, pulverizing the polymer, dissolving said powder in unpolymerized styrol, and polymerizing the solution to a colored vitreous polymerized styrol.

3. A method of making colored polymerized styrols which comprises dissolving a substantial azobenzol in styrol, completely polymerizing the solution, pulverizing the polymer, dissolving it in styrol, and polymerizing to a colored vitreous polymerized styrol.

4. A method for producing an amber-colored vitreous polymerized styrol which comprises dissolving para amino phenyl azobenzol in styrol, completely polymerizing the solution, pulverizing the polymer, dissolving it in styrol, and polymerizing to a colored vitreous polymerized styrol.

5. In a process for producing colored vitreous polymerized styrols, the steps of forming a coloring material, which comprise dissolving an azo dye in styrol, completely polymerizing the solution, and reducing the polymer to a powder.

6. As a new product amber-colored polymerized styrol combined with a substituted azo benzol.

7. As a new product styrol amber, a transparent vitreous product comprising polymerized styrol combined with a phenyl azo benzol.

8. As a new product styrol amber, a transparent vitreous product consisting of polymerized styrol combined with para amino phenyl azo benzol.

Signed at Cromwell, county of Middlesex, State of Connecticut, this 28th day of January, 1925.

IWAN OSTROMISLENSKY.

CERTIFICATE OF CORRECTION.

Patent No. 1,613,674.  Granted January 11, 1927, to

IWAN OSTROMISLENSKY.

It is hereby certified that error appears in the printed specification of the above numbered patent requiring correction as follows: Page 2, line 8, claim 3, for the word "substantial" read "substituted"; and that the said Letters Patent should be read with this correction therein that the same may conform to the record of the case in the Patent Office.

Signed and sealed this 19th day of June, A. D. 1928.

(Seal)

M. J. Moore,
Acting Commissioner of Patents.

CERTIFICATE OF CORRECTION.

Patent No. 1,613,674.                                    Granted January 11, 1927, to

IWAN OSTROMISLENSKY.

It is hereby certified that error appears in the printed specification of the above numbered patent requiring correction as follows: Page 2, line 8, claim 3, for the word "substantial" read "substituted"; and that the said Letters Patent should be read with this correction therein that the same may conform to the record of the case in the Patent Office.

Signed and sealed this 19th day of June, A. D. 1928.

(Seal)

M. J. Moore,
Acting Commissioner of Patents.